US00RE41200E

(19) United States
(12) Reissued Patent
Kondo

(10) Patent Number: US RE41,200 E
(45) Date of Reissued Patent: Apr. 6, 2010

(54) DIGITAL DATA CONVERSION EQUIPMENT AND A METHOD FOR THE SAME

(75) Inventor: Tetsujiro Kondo, Tokyo (JP)

(73) Assignee: Sony Corporation, Tokyo (JP)

(21) Appl. No.: 09/075,666

(22) Filed: May 11, 1998

Related U.S. Patent Documents

Reissue of:
(64) Patent No.: 5,517,588
Issued: May 14, 1996
Appl. No.: 08/061,730
Filed: May 17, 1993

(30) Foreign Application Priority Data

May 22, 1992 (JP) ..... 4-155719

(51) Int. Cl.
*G06K 9/03* (2006.01)
*H04N 7/01* (2006.01)

(52) U.S. Cl. ..... 382/300; 348/445
(58) Field of Classification Search ..... 382/254, 382/276, 299, 300; 348/448, 452, 443, 445, 348/454, 426, 426.1
See application file for complete search history.

(56) References Cited

U.S. PATENT DOCUMENTS 4,578,812 A * 3/1986 Yui
4,587,556 A * 5/1986 Collins ..... 348/443
4,611,348 A * 9/1986 Williams et al. ..... 382/300
4,630,307 A * 12/1986 Cok ..... 382/254
4,789,933 A * 12/1988 Chen et al. ..... 382/254
4,831,435 A * 5/1989 Song et al.
5,019,903 A * 5/1991 Dougall et al.
5,048,102 A * 9/1991 Tararine et al.
5,054,100 A * 10/1991 Tai
5,125,042 A * 6/1992 Kerr et al. ..... 358/428
5,148,499 A * 9/1992 Matsumura ..... 382/300
5,161,014 A * 11/1992 Pearson et al. ..... 348/443
5,229,868 A * 7/1993 Kanno et al. ..... 358/462
5,355,178 A * 10/1994 Parulski ..... 348/452
5,511,137 A * 4/1996 Okada ..... 382/300
5,832,132 A * 11/1998 Shimomura et al. ..... 382/254

FOREIGN PATENT DOCUMENTS

| | | | |
|---|---|---|---|
| EP | 0477822 | * | 4/1992 |
| EP | 0 477 822 | | 4/1992 |
| JP | 63-38381 | * | 2/1988 |
| JP | 63-48088 | * | 2/1988 |
| JP | 8317346 | | 11/1996 |
| WO | WO 86 01966 | | 3/1986 |
| WO | WO 92/03800 | * | 3/1992 |

OTHER PUBLICATIONS

Knee M J et al: "Bandwidth Compression for HDTV Broadcasting: Investigation of Some Adaptive Subsampling Strategies" Jul. 1988, UK, XP002138813.

(Continued)

*Primary Examiner*—Charles Kim
(74) *Attorney, Agent, or Firm*—Frommer Lawrence & Haug LLP; William S. Frommer; Thomas F. Presson

(57) ABSTRACT

In digital data conversion apparatus and method, class data are generated in association with reference interpolated data for each of a plurality of classes on the basis of a reference high definition digital video signal which includes a reference standard definition digital video signal in addition to the reference interpolated data. The class data is stored at respective addresses in a memory. A standard definition digital video signal representing pixel values is received and then clustered so as to produce a class corresponding to the pixel values of the standard definition digital video signal. The class data is retrieved from the memory address which corresponds to the class of the standard definition digital video signal, and interpolated data is generated in accordance with the standard definition digital video signal and the retrieved class data with such interpolated data constituting a high definition digital video signal.

38 Claims, 7 Drawing Sheets

OTHER PUBLICATIONS

Marescq J et al: "Vector Quantization in Transformed Image Coding" ICASSP 86 Proceedings. IEEE–IECEJ–ASJ International Conference on Acoustics, Speech and Signal Processing, (Cat. No. 86CH2243–4) Tokyo, Japan, Apr. 7–11, 1986, pp. 145–148, vol. 1, XP002138814.

Breeuwer M: "Transform Coding of Images Using Directionally Adaptive Vector Quantization" International Conference on Acoustics, Speech & Signal Processing, ICASSP, US, New York, IEEE, vol. Conf. 13, 1988, pp. 788–791, XP000092950.

Patent Abstracts of Japan, vol. 012, No. 265, Jul. 23, 1988, JP 63 048088, Feb. 29, 1988.

Patent Abstracts of Japan, vol. 012, No. 250, Jul. 14, 1988, JP 63 038381, Feb. 18, 1988.

Gonzalez et al. "Digital Image Processing", pp. 300–302, 1992, Addison Wesley.*

BBC Research Department Report, No. 9—Knee et al., "Bandwidth Compression for HDTV Broadcasting: Investigation of Some Adaptive Subsampling Strategies", pp. 1–13, Jul. 1988, Tadworth GB.*

Maresscq et al. "Vector Quantization in Transofrmed Image Coding" ICASSP '86, pp. 145–148, Apr. 11, 1986.*

Breeuwer "Transform Coding of Images Using Directionally Adaptive Vector Quantization", pp. 788–791, Apr. 14, 1986.*

ICASSP '86 Tokyo, 7–11 Apr. 1986, IEEE New York US pp. 145–148, Maresscq et al. 'Vector Quantization In Transformed Image Coding' paragraphs "Introduction " and Classification.*

ICASSP '88 New York, 11–14 Apr. 1988, vol. 2, IEEE, New York, US, pp. 788–791 Breeuwer 'Transform Coding Of Images Using Directionally Adaptive Vector Quantization' paragraph 1—paragraph 2.1*

* cited by examiner

DIGITAL DATA CONVERSION EQUIPMENT AND A METHOD FOR THE SAME

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a digital data conversion equipment and a method for the same, which are applicable to an interpolation of a thinned picture element in data conversion, up-conversion for converting a television signal with standard resolution into a television signal with high resolution and so on.

2. Description of the Prior Art

There are generally two kinds of systems for converting a digital video signal. One of them is a system for converting a signal whose resolution is high with respect to the space or time or a signal having a large amount of information into a signal of a low resolution. The other is a system for converting, on the contrary, a signal whose resolution is low with regard to the space or time or a signal having a small amount of information signal of a high resolution.

In the former case, a signal having inherently a large information amount is converted into a signal of a small information amount. For example, by properly thinning out a picture element information amount or field/frame information, a signal of a low space/time resolution can be easily formed.

The above example relates to what is called a down converter to, for instance, convert a video signal of a high definition (HD) system into a video signal of a standard definition (SD) system. Various kinds of techniques have already been proposed.

The latter case relates to up conversion to, for example, convert a video signal of the SD system to a video signal of the HD system. An example in which an electronic zooming process is executed or an enlargement of an image is performed is considered. In those examples, hitherto, information which inherently lacks is interpolated by using an interpolation filter and the interpolated information is used.

As still another example, there is a sub-sampling method for periodically thinning out pixel data in order to compress a recording/transmission data amount in the case where a capacity of the recording/transmitting system is limited. In this case, the images thinned out are interpolated on the reproducing/receiving side by using an interpolation filter.

However, there is a problem that the resolution of an output picture obtained by interpolation with a filter is degraded. For example, even if a HD television signal is formed by interpolating a SD video signal by a filter, an HD component (high frequency component) which is not present in an input SD signal is not reproduced. As a result, the spatial resolution of an output picture is lowered.

OBJECTS AND SUMMARY OF THE INVENTION

An object of the invention is to provide digital data conversion equipment and a method for the same capable of reproducing a high resolution component.

According to an aspect of the present invention, there is provided a digital data conversion equipment, comprising:

means for analyzing plural input data and performing clustering depending on a distribution state of the plural input data;

means for generating class data associated with output data for each class on the basis of the plural input data and known output data;

memory means for storing the class data at an address corresponding to the class;

read-out means for reading out class data at an address corresponding to class information subjected to clustering based on the plural input data; and output data generating means for generating output data based on output class data of the read-out means.

According to another aspect of the present invention, there is provided a digital data conversion method, comprising:

training step for analyzing plural input data, performing clustering depending on a distribution state of the plural input data, generating class data associated with known output data for every class on the basis of the plural input data and the output data, and storing the class data into a memory depending on the class;

step for clustering the plural input data and reading out class data at an address of the memory corresponding to the class; and step for generating output data based on the class data.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
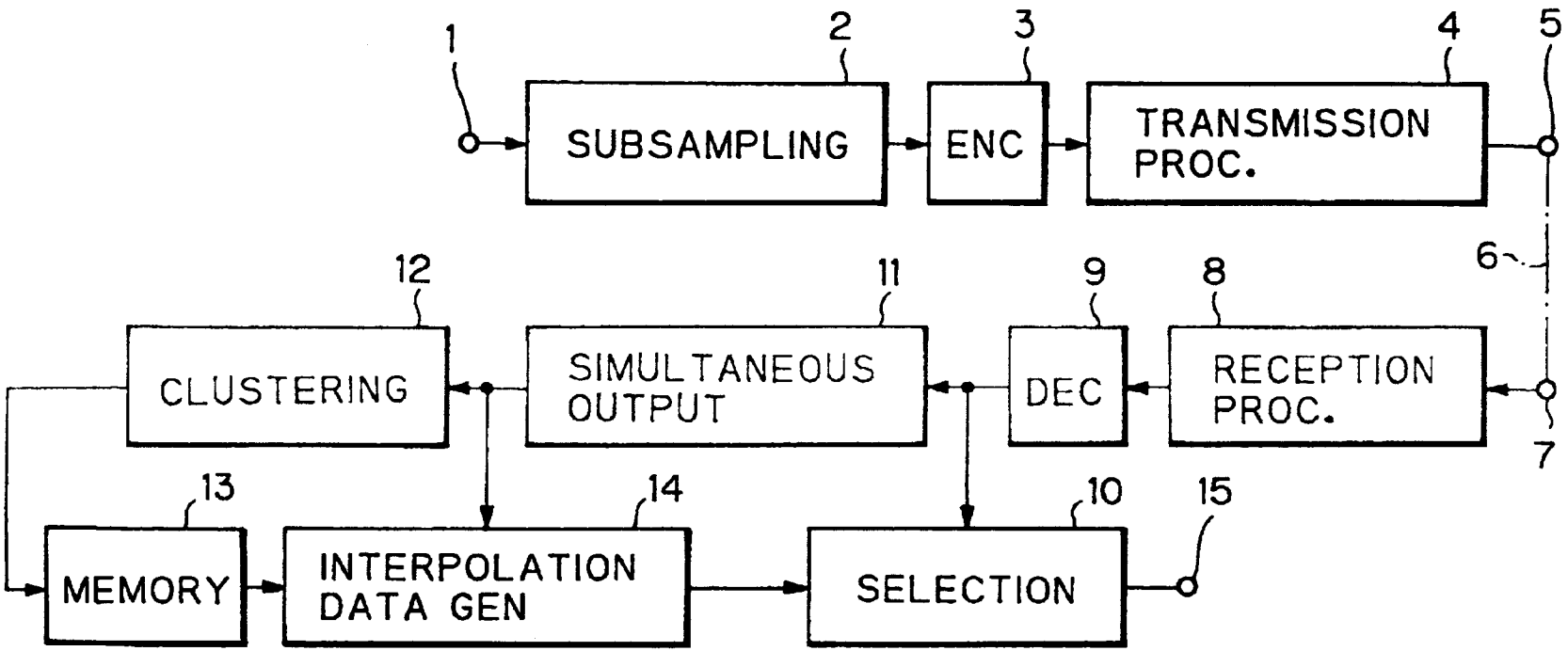
FIG. 1 is a schematic block diagram of a transmission system to which the invention is applied.

Hereunder, one embodiment of this invention will be explained. This one embodiment transmits thinned and compressed data and reproduces a thinned picture element on the reception side. FIG. 1 shows such a transmission system as a whole. In FIG. 1, reference numeral 1 is an input terminal for digital video data to be transmitted.

Figure 2:
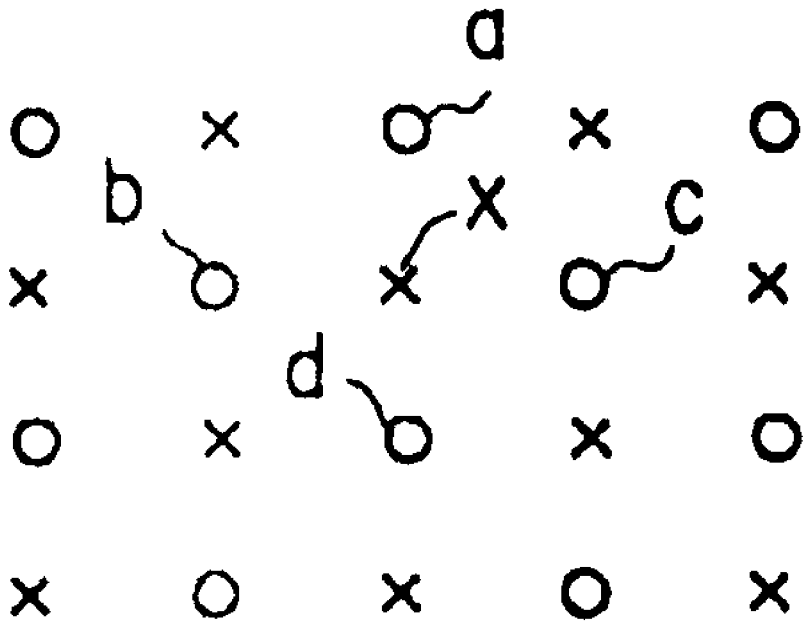
FIG. 2 is a schematic diagram showing a position relation of picture elements.

Input digital video data is supplied to a sampling circuit 2, and picture element data positioned alternately is thinned out in the horizontal direction. As shown in FIG. 2, picture elements indicated at X in the array of the original picture elements show the thinned picture elements a result, with this thinning-out process, the data amount necessary for transmission is reduced to half.

The output data of the sampling circuit 2 is supplied to an encoder for highly efficient coding. For the highly efficient coding, orthogonal conversion coding such as DCT (Discrete Cosine Transform), ADRC (Dynamic Range Adaptive-type Coding) and so on, which are well known, can be adopted. With this encoder 3, the data amount to be transmitted is reduced.

The output data of the encoder 3 is fed to a transmission processing circuit 4. The transmission processing circuit 4 performs processing such as error correction coding, frame formation and channel coding. Transmission data is generated at an output terminal 5 of the transmission processing circuit 4. The transmission data is supplied through a transmission line 6. The transmission line 6 is limited to a communication line and includes processes of magnetic recording and reproduction in its meaning.

Reception data is fed through an input terminal 7 to a reception processing circuit 8. The reception processing circuit 8 performs processing such as decoding of channel coding, frame decomposition, and error correction. The output of the reception processing circuit 8 is supplied to a decoder 9 for highly efficient coding. The decoded output of the decoder 9 is supplied to a selecting circuit 10 and a simultaneous output circuit 11.

The simultaneous output circuit 11, as shown in FIG. 2, produces transmission picture element data a, b, c, and d, which are present at upper and lower positions and left and right positions with respect to a thinned picture element x to be interpolated, to a clustering circuit 12 and an interpolation data generating circuit 14, simultaneously. Output data from the clustering circuit 14, i.e., class information, is given to a memory 13 as an address signal.

A mapping table for data conversion formed in a manner mentioned later is stored in the memory 13. In this example, a mapping table including plural parameters is stored in the memory 13. A parameter read out from an address corresponding to the output data of the clustering circuit 12 is supplied to the interpolation data generating circuit. The interpolation data generating circuit 14 provides interpolation data x by the calculation of:

$$x=w1a+w2b+w3c+w4d$$

using transmission picture element data a, b, c, and d from the simultaneous output circuit 11 and parameters w1, w2, w3, and w4 from the memory 14.

The interpolated data x is supplied to the selecting circuit 10. The selecting circuit 10 selects the output of the decoder 9 when a transmission picture element is present, while the selecting circuit 10 selects interpolated data from the interpolation data generating circuit 14 at a position of a thinned picture element. Consequently, decoded video data corresponding to reception data is provided at an output terminal 15 of the selecting circuit 10.

Figure 3:
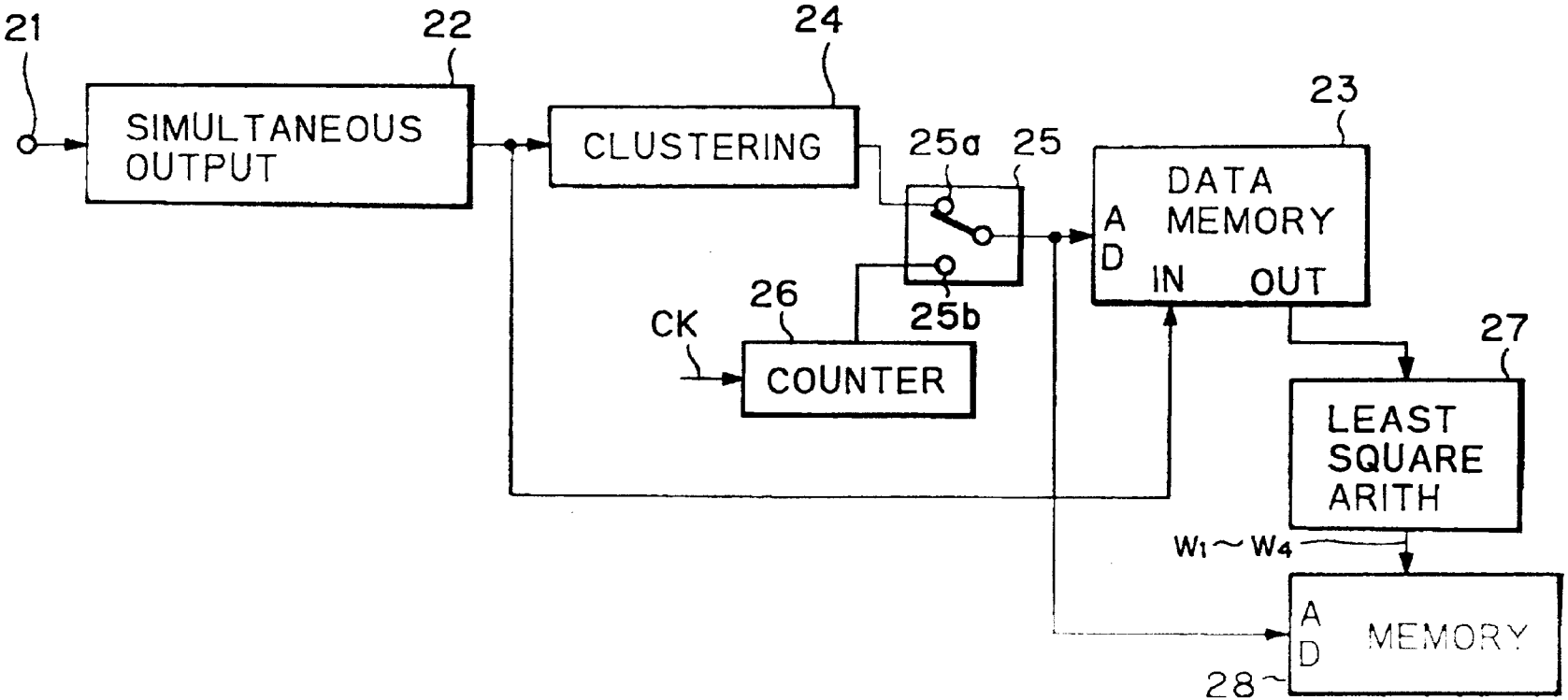
FIG. 3 is a block diagram of one example of a structure for generating a mapping table.

A mapping table formed in advance by training is stored in the memory 13. FIG. 3 shows a structure for forming the mapping table. In FIG. 3, a digital video signal is supplied to terminal 21 and to a simultaneous output circuit 22. It is desirable that the digital video signal is a standard signal taking into account the generation of a mapping table. For example, for the video signal, a signal composed of a still picture with various patterns can be adopted. As shown in FIG. 2, the simultaneous output circuit 22 supplies a data memory 23 and a clustering circuit 24 simultaneously with a data x, which is a target picture element, and picture element data a, b, c, and d, which are present in upper and lower positions and left and right portions with respect to the data x. It is to be noted that an actual value exists without any thinning of the target picture element at the time of the training shown in FIG. 3.

The clustering circuit 24 carries out the clustering picture element data to generate class information as the clustering circuit 12 of FIG. 1 does. For clustering, clustering by gradation, clustering by a pattern, etc., can be used. In the use of the gradation, the number of classes becomes extremely large if picture element data has eight bits. As a result, it is desirable that the bit number of each picture element is reduced with highly efficiency coding such as ADRC. For pattern use, plural patterns composed of four picture elements (for example, evenness, increase of a value in the right and upper direction, decrease of a value in the right and lower direction, etc.) are prepared, and the output data of the simultaneous output circuit 22 is classified into any one of the plural patterns.

The output of the clustering circuit 24 is given to one input terminal 25a of a switching circuit 25. The output of a counter 26 is supplied to the other input terminal 25b of the switching circuit 25. The counter 26 generates addresses, which sequentially change, by counting clock CK. The output of the switching circuit 25 is supplied to the data memory 23 and a memory 28 for parameters as their addresses.

Sample values of picture element a, b, c, d, and x are written into the data memory 23 with respect to addresses which are class information. For example, $(a_{10}, a_{20}, \ldots, a_{n0})$ with respect to the picture element data a, $(b_{10}, b_{20}, \ldots, b_{n0})$ as to the picture element data b, $(c_{10}, c_{20}, \ldots, c_{n0})$ with respect to the picture element data c, and $(d_{10}, d_{20}, \ldots, d_{n0})$ as to the picture element data d are stored in a certain address AD0 of the data memory 23. As for other addresses from the clustering circuit 24, picture element data is stored in the memory 23 similarly.

Next, the switching circuit 25 is switched from the input terminal 25a to 25b, and the content of the data memory 23 is sequentially read out by an address from the counter 26. The read-out of the data memory 23 is supplied to an arithmetic circuit 27 of the least square method. With this minimum square method, parameters w1 to w4 are obtained with minimum error.

When attention is paid to one address, the following simultaneous equations are established with respect to this address:

$$x1=w1a1+w2b1+w3c1+w4d1$$

$$x2=w1a2+w2b2+w3c2+w4d2$$

$$\vdots$$

$$xn=w1an+w2bn+w3cn+w4dn$$

Now, since x1 to xn, a1 to an, b1 to bn, c1 to cn, and d1 to dn are known in advance, the parameters w1 to w4 are obtained so that the square of the error for x1 to xn (actual values) is minimized. This applies to other addresses.

The parameters w1 to w4 obtained at the arithmetic circuit 27 are written into a memory 28. A mapping table which has been written into the memory 28 is stored in the memory 13 of FIG. 1. Therefore, the value of x, which is a thinned picture element, is produced at the interpolation data generating circuit 14 using the parameters produced from the memory 13.

Figure 4:
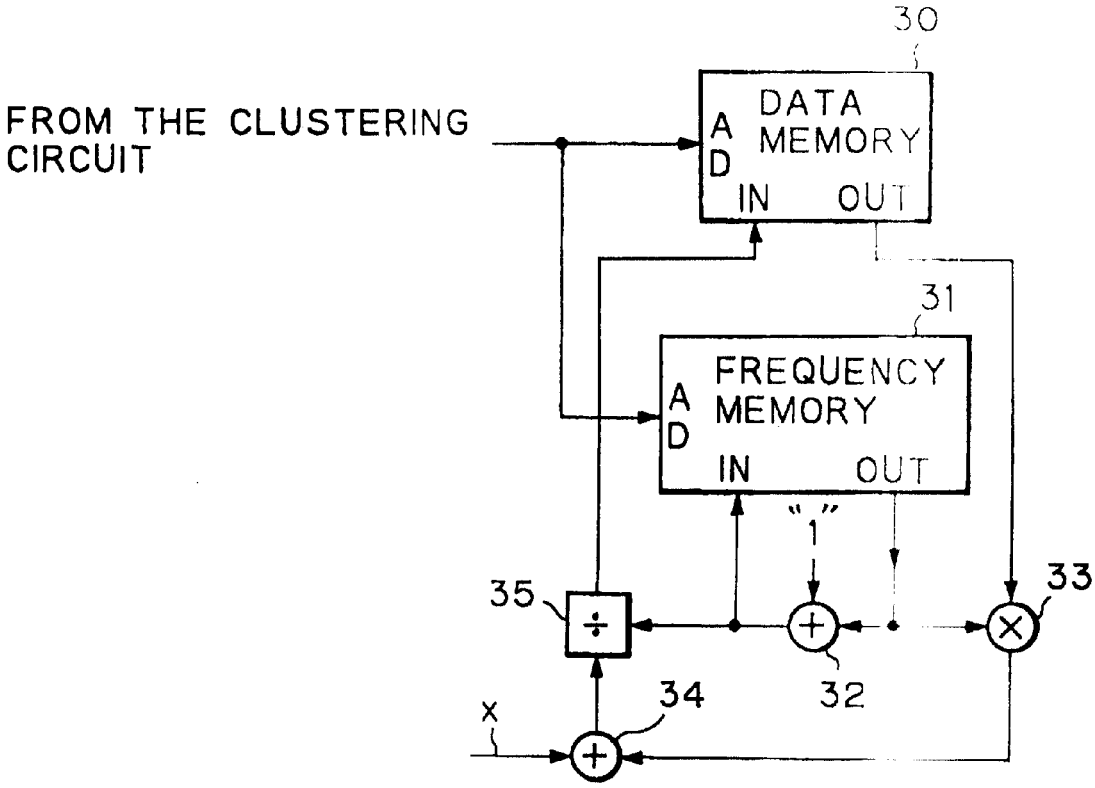
FIG. 4 is a block diagram of another example of a structure for generating a mapping table.

For the mapping table, not only the above-stated parameters but also the one from which output data values themselves are provided may be employed. In this case, the interpolation data generating circuit 14 in FIG. 1 can be omitted. FIG. 4 shows a structure for forming the mapping table. Similarly to the structure of FIG. 3, plural picture element data made simultaneously is supplied to the clustering circuit whose output is supplied to a data memory 30 and a frequency memory 31 as an address.

The read-out output of the frequency memory 31 is supplied to an adder 32 and added by +1. The output of the adder 32 is written into the same address of the memory 31. For the memories 30 and 31, each content of their addresses is cleared at zero as the initial stage.

Data read from the data memory 30 is supplied to a multiplier 33 and multiplied by a frequency which is read out of the frequency memory 31. The output of the multiplier 33 is given to an adder 34 and added to the input data x there. The output of the adder 34 is supplied to a divider 35 as a dividend. To the divider 35, the output of the adder 32 is fed as a divisor. The output of the divider 35 (quotient) becomes input data of the data memory 30.

In the above-mentioned structure of FIG. 4, data x1 is directly written into the memory 30 and the value of a corresponding address of the memory 31 is brought to 1, since the read outputs of the memories 30 and 31 are zero. If this address is accessed once again later, the output of the adder 32 is 2, and the output of the adder 34 is (x1+x2). As a result, the output of the divider 35 is (x1+x2)/2, which is written into the memory 30. On the other hand, the frequency z is written into the frequency memory 31. Further, when the above-mentioned address is accessed, the data of the memory 30 is updated to (x1+x2+x3)/3. The frequency is also updated to 3.

By carrying out the above-mentioned operation within a determined period, a mapping table is stored into the memory 30 so that data, which is present at that time, is output when a class is designated by the output of the clustering circuit. In other words, when plural picture element data of an input video signal is given, a mapping table can be formed so that data is output to correspond to its clustered data on the average.

Figure 5:
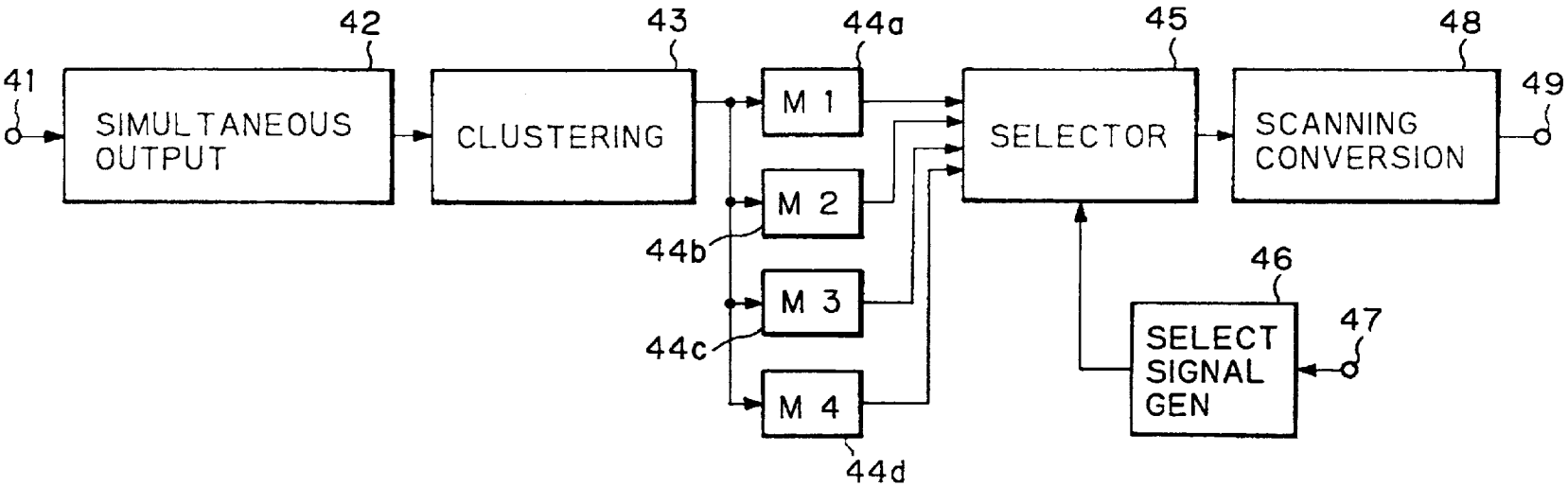
FIG. 5 is a block diagram of another embodiment.

Another embodiment of the invention shown in FIG. 5 is for up-conversion of a SD video signal to a HD video signal. In FIG. 5, a digital SD video signal is supplied to a terminal indicated at 41. Examples of the SD video signal are a reproduction signal, a broadcast signal, etc., of SDVTR. The SD video signal is given to a simultaneous output circuit 42 whose output data is supplied to clustering circuit 43. The output of the clustering circuit 43 is Sent as an address signal to memories 44a to 44d where mapping tables M1 to M4 are stored.

Figure 6:
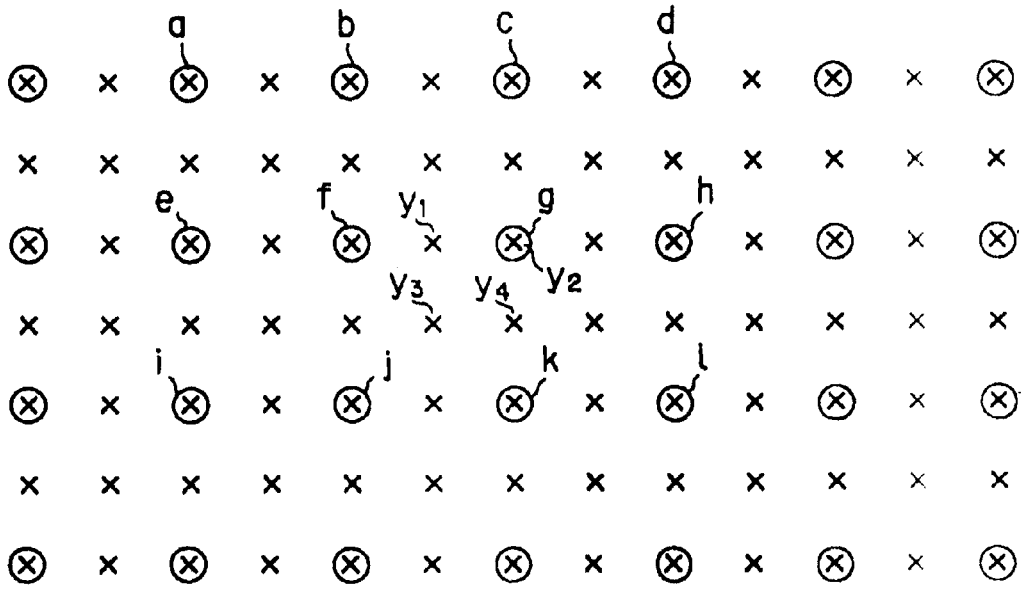
FIG. 6 is a schematic diagram showing a position relation of picture elements of a SD picture and a HD picture.

FIG. 6 partially shows a relationship between a SD picture and a HD picture. In FIG. 6, picture element data interpolated by circles O belongs to the SD picture, while picture element data indicated by crosses X belongs to the HD picture. For example, four picture element data y1 to y4 of the HD picture is generated from twelve picture element data of the SD picture. The mapping table M1 of the memory 44a is for generating picture element data y1, while the mapping tables M2, M3, and M4 are for generating picture element data y2, y3, and y4, respectively.

The read-out outputs of the memories 44a to 44d are given to a selector 45. The selector 45 is controlled by the output of a selection signal generating circuit 46. A sampling clock of the HD picture is supplied from an input terminal 47 to the selection signal generating circuit 46. The four picture element data y1 to y4 is selected sequentially by the selector 45 and is supplied to a scanning conversion circuit 48. The scanning conversion circuit 48 generates picture element data of the HD picture in the order of raster scanning at an output terminal 49. A monitor for HD is connected to the output terminal 49 through a D/A converter (not shown). The number of picture elements of an output picture is four times that of picture elements of an input SD video signal.

Figure 7:
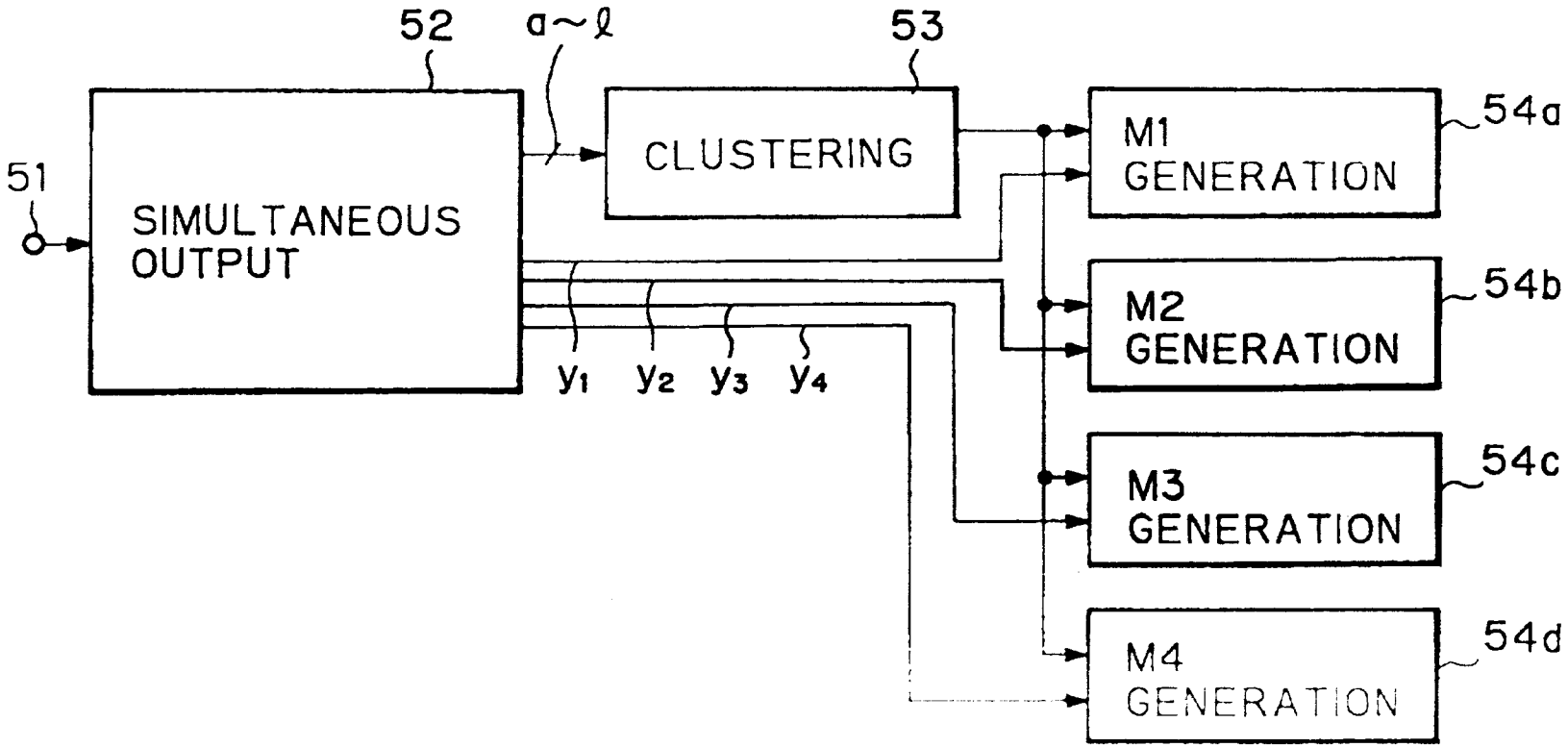
FIG. 7 is a block diagram of one example of a structure for generating a mapping table.

FIG. 7 shows one example of a structure for generating the mapping tables M1 to M4 stored in the memories 44a to 44d. In FIG. 7, a digital HD video signal is supplied to an input terminal indicated at 51. It is desirable that the HD video signal is a standard-like signal taking into account the generation of the mapping tables. Actually, by taking a standard picture with a HD video camera or by recording a taken picture signal onto HDVTR, a HD video signal can be provided.

The HD video signal is supplied to a simultaneous output circuit 52. The simultaneous output circuit 52 simultaneously produces picture element data a to 1 and y1 to y4 having a relationship in positions shown in FIG. 6. The picture element data a to 1 is supplied to a clustering circuit 53. The clustering circuit 53 performs the classification of gradation, patterns, etc., as in the above-mentioned one embodiment. The output of the clustering circuit 53 is commonly given to mapping table generating circuits 54a to 54d.

The picture element data y1 to y4 is supplied to the mapping table generating circuits 54a to 54d which have the same construction. The one similar to the structure for obtaining average value as shown in FIG. 4 can be adopted for the mapping table generating circuits 54a to 54d. In the case of the mapping table generating circuit 54a, y1a is supplied in place of the picture element data x in FIG. 4. For the mapping table generating circuit 54a, the same structure of FIG. 4 can be employed. In addition, with the use of parameters, the same structure as FIG. 3 may be used for mapping generating circuits 54a to 54d.

Mapping tables showing the correlation between the HD video signal and the SD video signal are stored in the mapping table generating circuits 54a to 54d. In other words, when plural data of the SD video signal is given, a mapping table, which outputs picture element data of the HD video signal on the average corresponding to the one provided by clustering these a plural data, can be formed. This mapping table is stored in the memories 44a to 44d with the structure of FIG. 5.

Although the above-mentioned one embodiment is an example where the up-conversion of the SD video signal to the HD video signal is made, the invention can be applied similarly to the enlargement of a picture, besides this embodiment.

According to the invention, data transmitted with a thinning-out system can be received, and a thinned picture element can be interpolated without the deterioration of resolution. When picture element data lacking at the time of picture element enlargement is interpolated, the invention is applicable in a similar manner. Also, the invention not only permits a video signal with standard resolution to be converted to that with high resolution but also allows a picture with high resolution to be displayed on a monitor.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. Digital data conversion apparatus, comprising:

memory means for storing class data for respective classes at addresses corresponding to said respective classes, said class data being associated with reference interpolated data and a reference standard definition digital video signal for each of said respective classes, said reference standard definition digital video signal and said reference interpolated data constituting a reference high definition digital video signal;

means for receiving a standard definition digital video signal including a plurality of pixel data representing pixel values;

means for clustering said pixel data of said standard definition digital video signal to produce a class in accordance with the pixel values of said pixel data;

means for retrieving said class data from the one of said addresses of said memory means corresponding to said class of said standard definition digital video signal; and means for generating a plurality of interpolated data in accordance with said standard definition digital video signal and said retrieved class data, in which a position of at least one of said clustered pixel data of said standard definition digital video signal is spatially located at the same position of at least one of said generated interpolated data.

2. The digital data conversion apparatus as claimed in claim 1, wherein said class data includes a plurality of coefficient data; and wherein said means for generating said plurality of interpolated data generates each of said interpolated data by adding respective products of a respective one of said coefficient data and a respective one of said pixel data.

3. The digital data conversion apparatus as claimed in claim 1, wherein the standard definition digital video signal is an orthogonally converted digital video signal and said means for receiving comprises means for decoding said orthogonally converted digital video signal to produce a decoded digital video signal.

4. The digital data conversion apparatus as claimed in claim 1, wherein said class data stored in said memory means corresponds to said interpolated data; and wherein said means for generating is operable to generate said interpolated data by providing said retrieved class data as said interpolated data.

5. A digital data conversion method, comprising the steps of:

storing class data for respective classes at addresses in a memory corresponding to said respective classes, said class data being associated with reference interpolated data and a reference standard definition digital video signal for each of said respective classes, said reference standard definition digital video signal and said reference interpolated data constituting a reference high definition digital video signal;

receiving a standard definition digital video signal including a plurality of pixel data representing pixel values;

clustering said pixel data of said standard definition digital video signal to produce a class in accordance with the pixel values of said pixel data;

retrieving said class data from the one of said addresses in said memory corresponding to said class of said standard definition digital video signal; and generating a plurality of interpolated data in accordance with said standard definition digital video signal and said retrieved class data, in which a position of at least one of said clustered pixel data of said standard definition digital video signal is spatially located at the same position of at least one of said generated interpolated data.

6. The digital data conversion method as claimed in claim 5, wherein said class data includes a plurality of coefficient data; and wherein the step of generating said plurality of interpolated data is carried out by adding respective products of a respective one of said coefficient data and a respective one of said pixel data.

7. The digital data conversion method as claimed in claim 5, wherein the standard definition digital video signal is an orthogonally converted digital video signal and the step of receiving further comprises decoding said orthogonally converted digital video signal to produce a decoded digital video signal.

8. The digital data conversion method as claimed in claim 5, wherein said class data stored in said memory corresponds to said interpolated data; and wherein said step of generating said interpolated data is carried out by providing said retrieved class data as said interpolated data.

9. Digital data conversion apparatus for converting a video signal admitting of a first standard into a video signal admitting of a second standard, a resolution of said video signal admitting of said first standard being lower than a resolution of said video signal admitting of said second standard, comprising:

memory means for storing class data for respective classes at addresses corresponding to said respective classes, said class data being associated with reference output data and reference input data admitting of said first standard for each of said respective classes, said reference input data admitting of said first standard and said reference output data constituting a reference digital video signal admitting of said second standard;

means for receiving an input digital video signal including a plurality of pixel data and admitting of said first standard;

means for clustering said pixel data of said input digital video signal to produce a class in accordance with values of said pixel data;

means for retrieving said class data from one of said addresses of said memory means corresponding to said class of said input digital video signal admitting of said first standard; and means for generating a plurality of interpolated data in accordance with said input digital video signal and said class data which has been retrieved, said interpolated data and said input digital video signal constituting a signal admitting of said second standard, and wherein a position of at least one of said clustered pixel data of said input digital video signal is spatially located at the same position of at least one of said generated interpolated data.

10. The digital data conversion apparatus as claimed in claim 9, wherein said class data includes a plurality of coefficient data; and wherein said means for generating said plurality of interpolated data is operable to generate each of said interpolated data by adding respective products of a respective one of said coefficient data and a respective one of said pixel data.

11. The digital data conversion apparatus as claimed in claim 9, wherein said class data stored in said memory means corresponds to said interpolated data; and wherein said means for generating is operable to generate said interpolated data by providing said retrieved class data as said interpolated data.

12. The digital data conversion apparatus as claimed in claim 9, further comprising means for generating said class data stored in said memory means.

13. Digital data conversion apparatus, comprising:

means for generating class data associated with reference interpolated data and reference standard definition digital video signal for each of a plurality of respective classes, said reference standard definition digital video signal and said reference interpolated data constituting a reference high definition digital video signal;

memory means for storing said class data for said respective classes of addresses corresponding to said respective classes;

means for receiving a standard definition digital video signal having a plurality of pixel data;

means for clustering said pixel data of said standard definition digital video signal to produce a class in accordance with values of said pixel data;

means for retrieving said class data from the one of said addresses of said memory means corresponding to said class of said standard definition digital video signal; and means for generating a plurality of interpolated data in accordance with said standard definition digital video signal and said retrieved class data, in which a position of at least one of said clustered pixel data of said standard definition digital video signal is spatially located at the same position of at least one of said generated interpolated data.

14. A digital data conversion method, comprising the steps of:

generating class data associated with reference interpolated data and a reference standard definition digital video signal for each of a plurality of respective classes, said reference standard definition digital video signal and said reference interpolated data constituting a reference high definition digital video signal;

storing said class data for said respective classes at addresses in a memory corresponding to said respective classes;

receiving a standard definition digital video signal having a plurality of pixel data;

clustering said pixel data of said standard definition digital video signal to produce a class in accordance with values of said pixel data;

retrieving said stored class data from the one of said addresses corresponding to said class of said standard definition digital video signal; and generating a plurality of interpolated data in accordance with said standard definition digital video signal and said retrieved class data, in which a position of at least one of said clustered pixel data of said standard definition digital video signal is spatially located at the same position of at least one of said generated interpolated data.

*15. A digital signal conversion apparatus for converting a first digital image signal to a second digital image signal having a high resolution component, comprising:*

*a memory for storing class data for respective classes at addresses corresponding to said respective classes, said class data obtained on the basis of at least a digital image signal having said high resolution component;*

*means for receiving said first digital image signal including pixel data representing pixel values;*

*means for clustering a plurality of pixel data of said first digital image signal adjacent to a pixel data of said second digital image signal to produce a class, a bit number of said pixel data of said first digital image signal being reduced;*

*means for retrieving said class data from one of said addresses of said memory corresponding to said class of said first digital image signal; and*

*means for generating all of pixel data, representing pixel values of said second digital image signal, in the same manner in accordance with a common algorithm based upon at least said retrieved class data in which a position of at least one of said clustered pixel data is spatially located at the same position of at least one of said generated data.*

*16. The digital signal conversion apparatus as claimed in claim 15, wherein said class data includes a plurality of coefficient data; and wherein said means for generating said pixel data representing pixel values of said second digital image signal generates each of said pixel data representing pixel values of said second digital image signal in accordance with the plurality of coefficient data and a plurality of pixel data of said first digital image signal.*

*17. The digital signal conversion apparatus as claimed in claim 15, wherein the first digital image signal is an orthogonally converted digital image signal and said means for receiving comprises means for decoding said orthogonally converted digital image signal to produce a decoded digital image signal.*

*18. The digital signal data conversion apparatus as claimed in claim 15, wherein said class data stored in said memory corresponds to said pixel data representing pixel values of said second digital image signal; and wherein said means for generating is operable to generate said pixel data representing pixel values of said second digital image signal by providing said retrieved class data as said pixel data representing pixel values of said second digital video signal.*

*19. A digital signal data conversion method for converting a first digital image signal to a second digital image signal having a high resolution component, comprising the steps of:*

*storing class data for respective classes at addresses in a memory corresponding to said respective classes, said class data obtained on the basis of at least a digital image signal having said high resolution component;*

*receiving said first digital image signal including pixel data representing pixel values;*

*clustering a plurality of pixel data of said first digital image signal adjacent to a pixel data of said second digital image signal to produce a class, a bit number of said pixel data of said first digital image signal being reduced;*

*retrieving said class data from one of said addresses of said memory corresponding to said class of said first digital video signal; and*

*generating all of pixel data, representing pixel values of said second digital image signal, in the same manner in accordance with a common algorithm based upon at least said retrieved class data in which a position of at least one of said clustered pixel data is spatially located at the same position of at least one of said generated data.*

*20. The digital signal conversion method as claimed in claim 19, wherein said class data includes a plurality of coefficient data; and wherein the step of generating said pixel data representing pixel values of said second digital video signal generates each of said pixel data representing pixel values of said second digital image signal in accordance with the plurality of coefficient data and a plurality of pixel data of said first digital image data.*

*21. The digital signal conversion method as claimed in claim 19, wherein the first digital image signal is an orthogonally converted digital image signal and the step of receiving further comprises decoding said orthogonally converted digital image signal to produce a decoded digital image signal.*

*22. The digital signal conversion method as claimed in claim 19, wherein said class data stored in said memory corresponds to said pixel data representing pixel values of said second digital image signal and wherein said step of generating said pixel data representing pixel values of said second digital image signal is carried out by providing said retrieved class data as said pixel data representing pixel values of said second digital image signal.*

*23. A digital signal conversion apparatus for converting a digital video signal admitting of a first standard into a digital video signal admitting of a second standard, a first resolution of said digital video signal admitting of said first standard being lower than a second resolution of said digital video signal admitting of said second standard, comprising:*

*a memory for storing class data for respective classes at addresses corresponding to said respective classes, said class data obtained on the basis of at least a digital video signal admitting of said second standard having said second resolution;*

*means for receiving an input digital video signal including pixel data and admitting of said first standard;*

*means for clustering a plurality of pixel data of said input digital video signal adjacent to a pixel data of a digital video signal admitting of said second standard to produce a class, a bit number of said pixel data of said input digital video signal being reduced;*

*means for retrieving said class data from one of said addresses of said memory corresponding to said class of said input digital video signal admitting of said first standard;*

*means for generating all of pixel data, representing pixel values of said digital video signal admitting of said second standard, in the same manner in accordance with a common algorithm based upon at least said class data which has been retrieved in which a position of at least one of said clustered pixel data of said digital video signal admitting of said first standard is spatially located at the same position of at least one of said generated data.*

*24. The digital signal conversion apparatus as claimed in claim 23, wherein said class data includes a plurality of coefficient data; and wherein said means for generating said pixel data representing pixel values of said digital video signal admitting of said second standard is operable to generate each said pixel data representing pixel values of said digital video signal admitting of said second standard in accordance with the plurality of coefficient data and a plurality of pixel data of said digital video signal admitting of said first standard.*

*25. The digital signal conversion apparatus as claimed in claim 23, wherein said class data stored in said memory corresponds to said pixel data representing pixel values of said digital video signal admitting of said second standard and wherein said means for generating is operable to generate said pixel data representing pixel values of said digital video signal admitting of said second standard by providing said retrieved class data as said pixel data representing pixel values of said digital video signal admitting of said second standard.*

*26. The digital signal conversion apparatus as claimed in claim 23, further comprising means for generating said class data stored in said memory.*

*27. A digital signal conversion apparatus for converting a standard definition digital video signal to a high definition digital video signal, comprising:*

*a memory for storing class data for respective classes at addresses corresponding to said respective classes, said class data obtained on the basis of at least a digital video signal having a high resolution component;*

*means for receiving said standard definition digital video signal having pixel data representing pixel values;*

*means for clustering a plurality of pixel data of said standard definition digital video signal adjacent to a pixel data of said high definition digital video signal to produce a class, a bit number of said pixel data of said standard definition digital video signal being reduced;*

*means for retrieving said class data from one of said addresses of said memory corresponding to said class of said standard definition digital video signal; and*

*means for generating all of pixel data, representing pixel values of said high definition digital video signal, in the same manner in accordance with a common algorithm based upon at least said retrieved class data in which a position of at least one of said clustered pixel data of said standard definition digital video signal is spatially located at the same position of at least one of said generated data.*

*28. The digital signal conversion apparatus as claimed in claim 27, wherein said class data includes a plurality of coefficient data; and wherein said means for generating the pixel data representing pixel values of said high definition digital video signal generates each of said pixel data representing values of said high definition digital video signal in accordance with the plurality of coefficient data and a plurality of pixel data of said standard definition digital video signal.*

*29. The digital signal conversion apparatus as claimed in claim 28, wherein said class data stored in said memory corresponds to said pixel data representing pixel values of said high definition digital video signal; and said means for generating is operable to generate said pixel data representing pixel values of said high definition digital video signal by providing said retrieved class data as said pixel data representing pixel values of said high definition digital video signal.*

*30. A digital signal conversion method, comprising the steps of:*

*storing class data for respective classes at addresses in a memory corresponding to said respective classes, said class data obtained on the basis of at least a digital video signal having a high resolution component;*

*receiving a standard definition digital video signal having pixel data representing pixel values;*

*clustering a plurality of pixel data of said standard definition digital video signal adjacent to a pixel data of a high definition digital video signal to produce a class, a bit number of said pixel data of said standard definition digital video signal being reduced;*

*retrieving said stored class data from one of said addresses corresponding to said class of said standard definition digital video signal; and*

*generating all of pixel data, representing pixel values of said high definition digital video signal, in the same manner in accordance with a common algorithm based upon at least said retrieved class data in which a position of at least one of said clustered pixel data of said standard definition digital video signal is spatially located at the same position of at least one of said generated data.*

*31. The digital signal conversion method as claimed in claim 30, wherein said class data includes a plurality of coefficient data; and wherein said step for generating the pixel data representing pixel values of said second output*

*digital video signal generates each of said pixel data representing values of a high definition video signal in accordance with the plurality of coefficient data and a plurality of pixel data of said standard definition digital video signal.*

*32. The digital signal conversion method as claimed in claim 30, wherein said stored class data corresponds to said pixel data representing pixel values of said second output digital video signal; and said step for generating is operable to generate said pixel data representing pixel values of said second output digital video signal by providing said retrieved class data as pixel data representing pixel values of a high definition digital video signal.*

*33. A digital data conversion apparatus for converting a first digital image signal to a second digital image signal having a high resolution component, comprising:*

*a memory for storing class data for respective classes at addresses corresponding to said respective classes, said class data obtained on the basis of at least digital image data having said high resolution component;*

*means for receiving said first digital image signal including pixel data representing pixel values;*

*means for clustering a plurality of pixel data of said first digital image signal adjacent to a plurality of pixel data of said second digital image signal to produce a class, a bit number of said pixel data of said first digital image signal being reduced and said class being used to retrieve a class data to generate a plurality of pixel data representing pixel values of said second digital image signal;*

*means for retrieving said class data from addresses of said memory corresponding to said class of said first digital image signal; and*

*means for generating all of said pixel data, representing pixel values of said second digital image signal, in the same manner in accordance with a common algorithm based upon at least said retrieved class data in which a position of at least one of said clustered pixel data is spatially located at the same position of at least one of said generated data.*

*34. The digital data conversion apparatus as claimed in claim 33, wherein said class data includes a plurality of coefficient data; and wherein said means for generating the plurality of pixel data representing pixel values of said second digital image signal generates each of said pixel data representing values of said second digital image signal in accordance with the plurality of coefficient data and a plurality of pixel data representing pixel values of said first digital image data.*

*35. The digital data conversion apparatus as claimed in claim 33, wherein said class data stored in said memory corresponds to said pixel data representing pixel values of said second digital image signal; and said means for generating is operable to generate said pixel data representing pixel values of said second digital image signal by providing said retrieved class data as said pixel data representing pixel values of said second digital image signal.*

*36. A digital data conversion method for converting a first digital image signal to a second digital image signal having a high resolution component, comprising the steps of:*

*storing class data for respective classes at addresses in a memory corresponding to said respective classes, said class data obtained on the basis of at least digital image data having said high resolution component;*

*receiving said first digital image signal including pixel data representing pixel values;*

*clustering a plurality of pixel data of said first digital image signal adjacent to a plurality of pixel data of said second digital image signal to produce a class, a bit number of said pixel data of said first digital image signal being reduced and said class being used to retrieve a class data to generate a plurality of pixel data representing pixel values of said second digital image signal;*

*retrieving said class data from addresses of said memory corresponding to said class of said first digital image signal; and*

*generating all of said pixel data, representing pixel values of said second digital image signal, in the same manner in accordance with a common algorithm based upon said retrieved class data in which a position of at least one of said clustered pixel data is spatially located at the same position of at least one of said generated data.*

*37. The digital data conversion method as claimed in claim 36, wherein said class data includes a plurality of coefficient data; and wherein said step for generating the plurality of pixel data representing pixel values of said second digital image signal generates each of said pixel data representing values of said second digital image signal in accordance with the plurality of coefficient data and a plurality of pixel data representing pixel values of said first digital image data.*

*38. The digital data conversion method as claimed in claim 36, wherein said class data stored in said memory corresponds to said pixel data representing pixel values of said second digital image signal; and said step for generating is operable to generate said pixel data representing pixel values of said second digital image signal by providing said retrieved class data as said pixel data representing pixel values of said second digital image signal.*

* * * * *